United States Patent [19]
Taber

[11] Patent Number: 5,800,102
[45] Date of Patent: Sep. 1, 1998

[54] KEY AND RETAINER DEVICE FOR A CHUCK

[75] Inventor: William D. Taber, Greenville, S.C.

[73] Assignee: Hall's Machining Services, Inc., Easley, S.C.

[21] Appl. No.: 931,106

[22] Filed: Sep. 15, 1997

[51] Int. Cl.⁶ .................................................. B23B 39/00
[52] U.S. Cl. ........................... 408/241 R; 81/16; 279/147; 279/148; 408/240
[58] Field of Search ..................... 408/239 R, 238, 408/240, 241 R; 209/148, 147, 149; 81/16

[56] References Cited

U.S. PATENT DOCUMENTS

| | | | |
|---|---|---|---|
| 2,807,732 | 9/1957 | Kurtovich | 310/50 |
| 3,728,038 | 4/1973 | Gage | 408/241 R |
| 4,123,195 | 10/1978 | Purviance | 408/241 R |
| 4,324,512 | 4/1982 | Siroky | 408/240 |
| 4,386,879 | 6/1983 | Martinmaas | 408/241 R |
| 4,389,146 | 6/1983 | Coder | 408/240 |
| 4,460,296 | 7/1984 | Sivertson, Jr. | 408/124 |
| 4,718,797 | 1/1988 | Purviance | 408/241 R |
| 4,999,018 | 3/1991 | Wenz, Jr. | 279/149 |
| 5,011,343 | 4/1991 | Saban et al. | 408/240 |
| 5,030,144 | 7/1991 | Eros | 408/241 R |
| 5,069,585 | 12/1991 | Wenz, Jr. | 408/241 R |

FOREIGN PATENT DOCUMENTS

| | | | |
|---|---|---|---|
| 362669 | 2/1973 | U.S.S.R. | 408/241 R |

Primary Examiner—Daniel W. Howell
Assistant Examiner—Adesh Bhargava
Attorney, Agent, or Firm—Robert R. Reed; Cort Flint

[57] ABSTRACT

The present invention uses a collar that fits over a nose and a locking cylinder of a chuck of the drilling machine. The collar has a cutout section to accommodate the chuck key including the key gear when it is engaged with the beveled gear of the locking cylinder. The collar has a first bore of a first diameter with is slightly larger than the outer diameter of the nose to provide a tight fit between the collar and the nose of the chuck. A fastener is used to attach the collar to the nose of the chuck. A second bore has a second diameter to fit over at least the beveled gear of the locking cylinder. The second diameter is large enough to provide a clearance so that the locking cylinder is free to rotate within the collar. Turning the chuck key about a key axis opens or closes the jaws of the chuck to grip or release a bit placed along a drill axis of the drilling machine.

19 Claims, 6 Drawing Sheets

KEY AND RETAINER DEVICE FOR A CHUCK

BACKGROUND OF THE INVENTION

This invention relates to drilling machines, and more particularly to gripping and releasing a bit held by a chuck of the drilling machine. The invention relates directly to the use of a chuck key to operate the chuck of the drilling machine.

A conventional chuck assembly for a drilling machine is a Jacobs type chuck commonly used in the industry. Other similar type chucks can also be used with the improvements of this invention. The chuck is operated for gripping and releasing a drill bit used with the drilling machine to drill holes in objects. A wide variety of drilling machines use the conventional chuck assembly including an engine lathe, a drill press, hand held drills and CNC equipment. Some of the chuck assemblies are rotating during the hole drilling operation and others are attached to a main drill shaft and spindle which are linearly advanced to push the drill bit into a rotating object, as with an engine lathe.

The conventional chuck is generally operated with a chuck key which is a separate tool used to rotate a first part of the chuck with respect to a second part of the chuck to position jaws so that they grip and release a drill bit held by the chuck. Generally speaking, the chuck key includes a key retainer pin that fits into pilot holes in the first part and a key gear held in place against a beveled gear of the second part. As the chuck key is rotated the jaws open or close to grip or release the drill bit. The problems associated with finding the chuck key when needed and holding the key gear of the chuck key engaged with the beveled gear when rotating the chuck key portions relative to one another are well known in the art. A need exists in the art to economically solve these problems with new and existing drilling machines.

A number of solutions exist in the art for modifying drilling tools to place the chuck key of the Jacobs type chuck within a modified housing of the drilling tool. These solutions are illustrated in U.S. Pat. Nos. 2,807,731; 4,324,512; and 4,389,146. The first two references disclose a spring loaded chuck key that is part of the original drill housing which has been modified to provide for the chuck key. In each case the chuck key is used with a drill that rotates the chuck; unlike the chuck of a fixed lathe head.

In U.S. Pat. No. 2,807,732 a spring loaded chuck key is retracted and held by a holding bar while the chuck rotates. A switch assembly forces the chuck key to be held in a retracted position when the drill is operating. A trigger device is activated to engage the chuck key with the beveled gear of the sleeve. A drill housing has been modified to house the built-in chuck key.

The disclosure of U.S. Pat. No. 4,324,512 illustrates a spring loaded chuck key assembly permanently mounted in a power tool housing. A shaft locking device is also used to hold the main shaft of the drill from rotating as a fixed shaft. A chuck key handle is depressed to engage the chuck key with rear end of the chuck. The chuck key assembly is part of a drill having a rotating shaft; unlike the chuck of a fixed lathe.

The housing of the hand drill of U.S. Pat. No. 4,389,146 has also been modified to allow for an accessory to be added to a reversible drill type tool. The disclosure of this patent describes the use of the accessory so that the drill can be operated to engage or disengage a drill bit. The conventional chuck key is not used with this hand drill.

Another accessories are known in the art are for replacing a chuck key. For example, an annular support pivoted on the chuck collar in U.S. Pat. No. 4,386,879 discloses a ring gear operating means that rotates to disengage a bit from the jaws of a chuck. The nose collar of the chuck has been modified to support the ring gear operating means. Once again the chuck and the chuck key have been modified to be manufactured as a part of the electric drill.

Operating the rotary tool to assist in disengaging the drill bit is also disclosed in U.S. Pat. Nos. 4,460,296 and 5,011,343. These chuck assembly means require a chuck that is rotated by the rotary tool with enough power to release the drill bit. The need remains for releasing a drill bit of non-rotating chucks and chucks used with a large drilling machine using a chuck key.

Accordingly, an object of the present invention is to provide an improved means for holding a chuck key in an engaged relationship with the chuck of a drilling machine.

Another object of the present invention is to provide a device for allowing a chuck key to become permanently or semi-permanently attached with the chuck on a drilling machine.

Yet another object of the present invention is to provide an aftermarket device for a chuck of a drilling machine that can be used for holding a chuck key engaged with beveled gears of the chuck. Engagement is to be maintained between the chuck key and the chuck without lateral hand pressure on the chuck key handle.

A further object of the present invention is to provide a two part chuck key so that a key retainer device can be used to permanently affix a key gear of the chuck key in an engaged relationship with the beveled gear of a rotating chuck of a drilling tool.

SUMMARY OF THE INVENTION

The above objectives for a drilling machine are accomplished according to the present invention by using a collar that fits over a nose and a locking cylinder of a chuck of the drilling machine. The collar has a cutout section to accommodate the chuck key including the key gear when it is engaged with the beveled gear of the locking cylinder. The collar has a first bore of a first diameter with is slightly larger than the outer diameter of the nose to provide a tight fit between the collar and the nose of the chuck. A fastener is used to attach the collar to the nose of the chuck. A second bore has a second diameter to fit over at least the beveled gear of the locking cylinder. The second diameter is large enough to provide a clearance so that the locking cylinder is free to rotate within the collar. Turning the chuck key about a key axis opens or closes the jaws of the chuck to grip or release a bit placed along a drill axis of the drilling machine.

A chuck assembly of the present invention is for gripping and releasing a bit held by a drilling machine. The assembly comprises a chuck having a nose, a locking cylinder with a beveled gear and locking jaws within the nose for gripping and releasing the bit positioned along a drill axis when the nose is rotated relative to the locking cylinder. A chuck key is slidably mounted in the nose along a key axis normal to the drill axis, the chuck key has a key gear for engaging the beveled gear of the locking cylinder and the chuck key is rotatable about the key axis. A collar having a first bore for fitting said collar over the nose and a second bore, larger than the first bore, encompasses the beveled gear of the locking cylinder. The assembly also comprises a fastener for holding the collar attached to the nose of the chuck. The collar has key cutouts for containing and holding the key gear of said chuck key in an engaged relationship with the beveled gear of the locking cylinder, so that turning the chuck key about the key axis provides the rotation of the nose with respect to the locking cylinder to operate the locking jaws.

In another embodiment of the invention the chuck key is used with a chuck which is operational to rotate about said drill axis. The chuck key includes a two part key shaft having a fixed key shaft portion and a removable key shaft portion. The fixed key shaft portion is affixed to the key gear and remains contained by the collar. The removable key shaft portion is disengaged from the fixed key shaft portion during rotation of the chuck. A handle is affixed to the removable key shaft portion for operating the chuck key. A key shaft interface between the fixed and removable key shaft portions is for engaging the removable key shaft portion and handle from the fixed key shaft portion. The key shaft interface includes an interface tool for interlocking the two part key shaft together for transferring torque applied to the handle about the key axis to the key gear to operate the locking jaws.

A generic embodiment of the invention includes in a drill machine, a drill chuck, a chuck key slidably mounted in the drill machine adjacent the chuck, a collar slidably mounted on the drill machine for engaging with the chuck, biasing the chuck key toward a locking engagement with the chuck and holding the chuck key engaged with the chuck. A fastener is included for holding the collar engaged with the chuck so that the chuck key is held in position against the chuck, but is free to rotate in operating the chuck for gripping and releasing a bit of the drill machine.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

According to the present invention an improved chuck assembly is provided for use with a drilling machine. The chuck assembly allows a chuck key to remain attached to the chuck for operating the locking jaws when gripping or releasing a drill bit when the drilling machine is in use.

Figure 1:
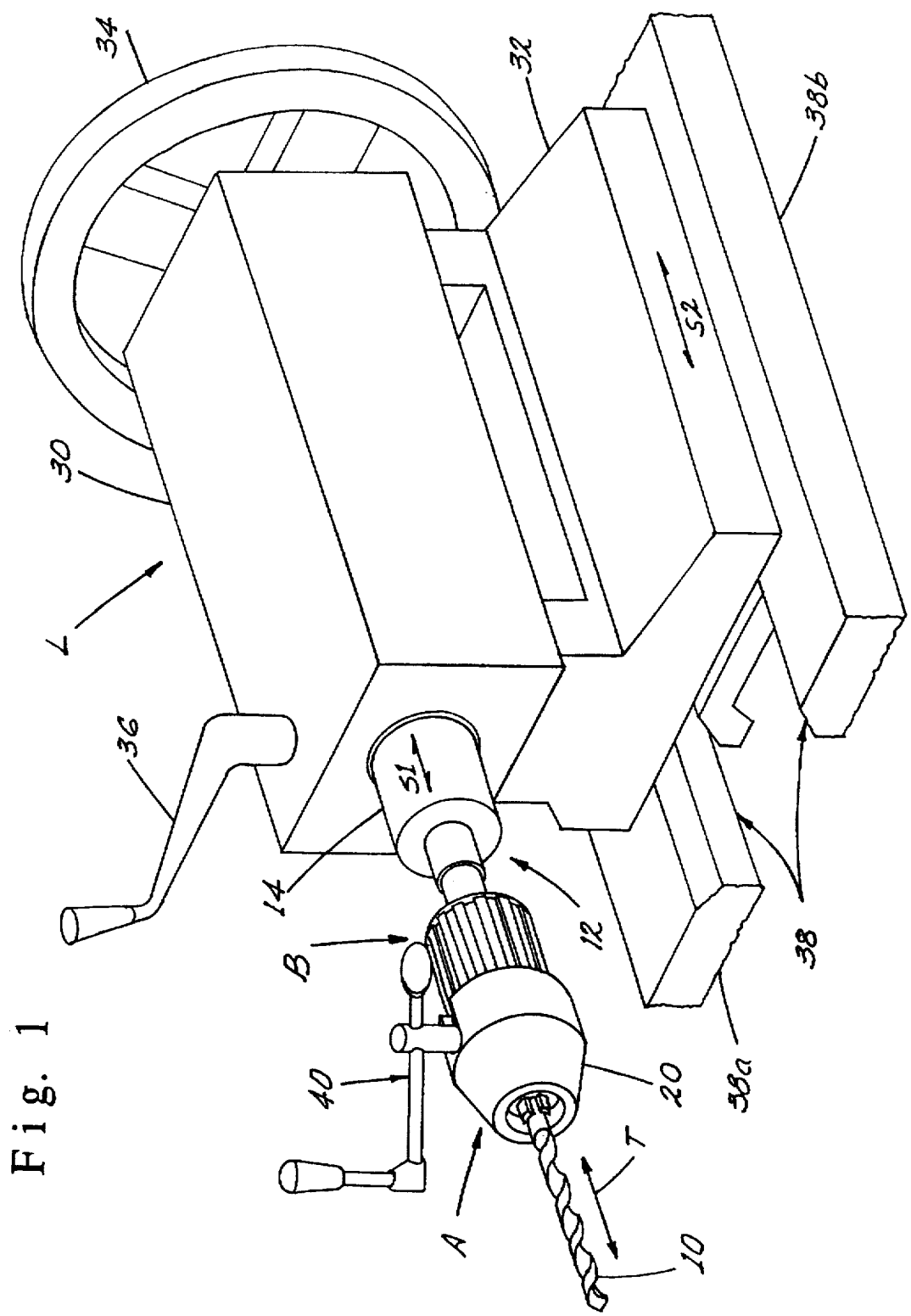
FIG. 1 is a perspective view of a chuck assembly of this invention showing a collar holding a chuck key for engaging a chuck to grip or release a drill bit used with a tail stock assembly of a drilling or lathe machine.

Referring now in more detail to the drawings, the invention will now be described in more detail. A typical application of a chuck assembly of this invention is illustrated in the perspective view of FIG. 1. This illustration shows a key retainer device A of a chuck assembly B connected by a drill shaft 12 extending from a tail stock assembly L of an engine lathe drilling machine. Details of the key retainer device A are disclosed in more detail by referring to the illustrations of FIGS. 3, 4 and 5. The top view of FIG. 3 is taken along the key axis K and shows key cutouts 25 made from end surface 20a of the collar to include the key axis. The key cutouts generate a key shaft cutout surface 26a and a key gear cutout surface 28a for receiving the chuck key when placing the key retainer device on the chuck. A fastener device bore 21a is placed on the opposite side of the collar to receive the fastener 21 (FIG. 2).

Describing in more detail the operation of a drilling machine with a non-rotating drill shaft, refer again to FIG. 1. A housing 30 contains various components necessary to move a spindle 14 of the drill shaft 12 in and out of the housing along the direction indicated as the arrow S1 for translating a drill bit 10 in a direction shown by the arrow, referred to as the bit translation T. The translation of the bit is provided by rotating a spindle advancement wheel 34 in one direction or the other. The general position of the housing in the bit translation direction is provided by moving a housing support 32 along machine rails 38, as illustrated by the position arrow S2. A locking handle 36 is rotated to lock the location of the housing support 32 along the machine rails. The retainer device includes a collar 20 for holding a chuck key 40 in a position for operating the chuck assembly to grip or release the drill bit 10 when the chuck key is rotated.

Figure 2:
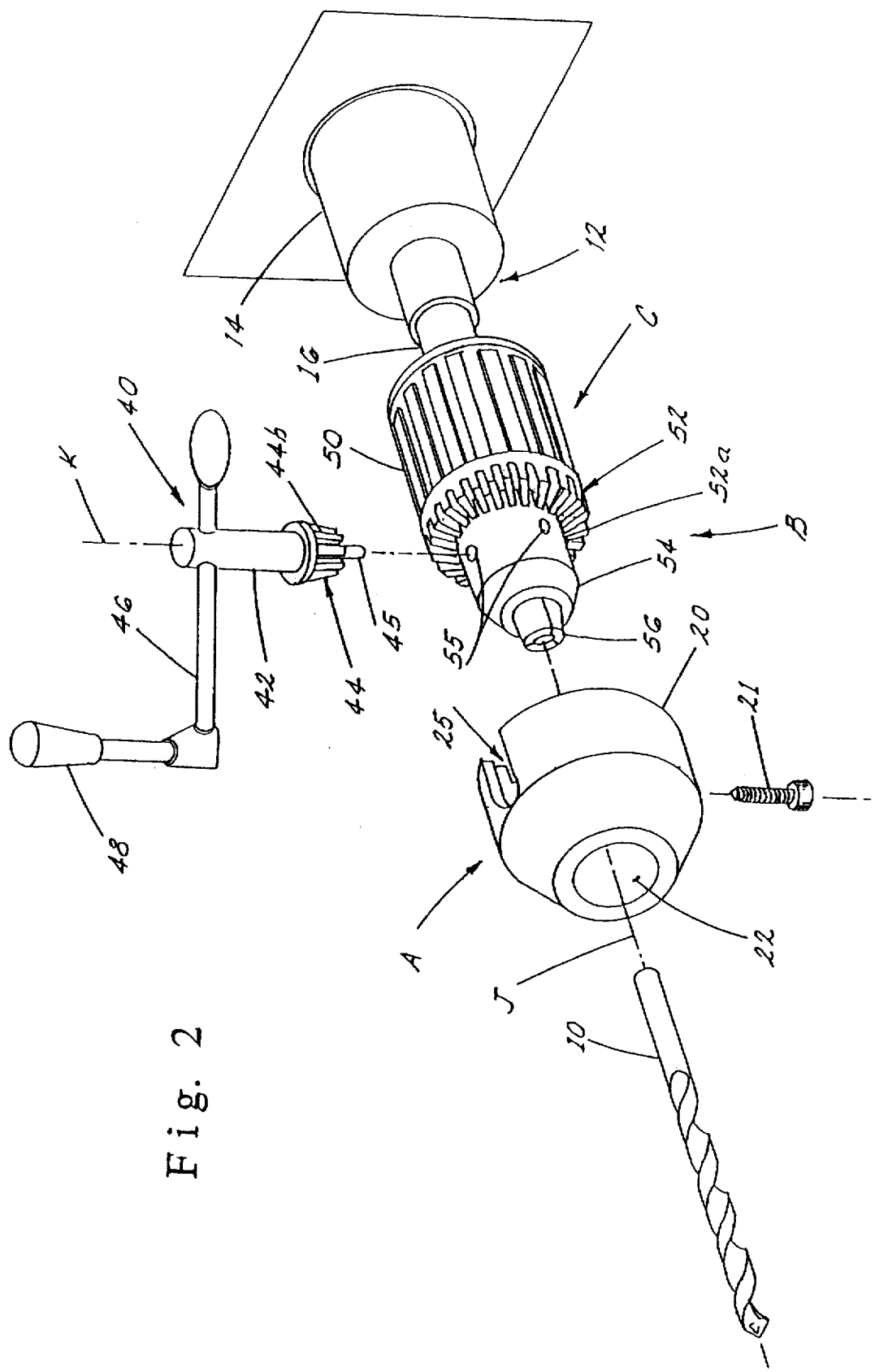
FIG. 2 is an exploded perspective view of the chuck assembly of this invention illustrating the position of the various components of the assembly prior to being connected together.
Figure 3:
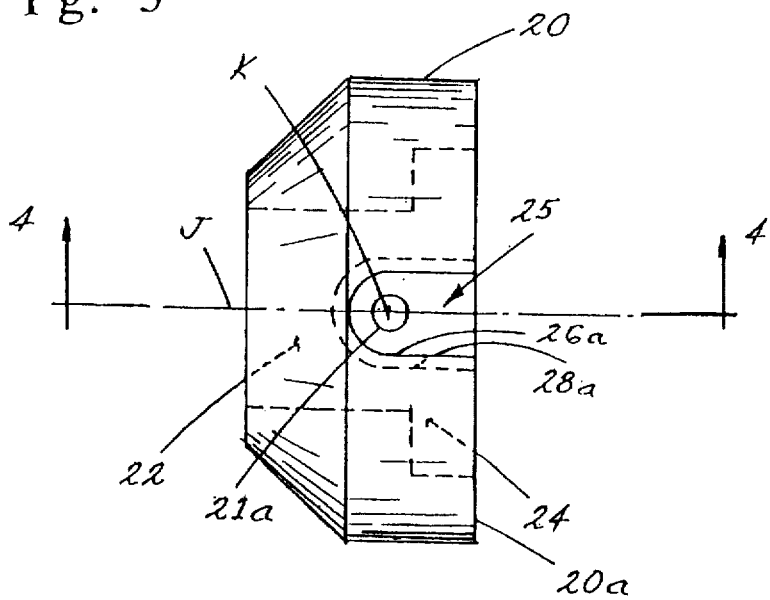
FIG. 3 is a side elevation view of the collar of this invention.

An exploded view of the chuck assembly B is illustrated in FIG. 2. A typical Jacobs type chuck C includes a locking cylinder 50 with a beveled gear 52, a nose 54 and locking jaws 56 within the nose for gripping and releasing a drill bit 10. The chuck is attached to a main shaft and spindle of a drilling machine (not shown). The chuck assembly further includes a retainer device A including a collar 20 and a chuck key 40 for operating the chuck. The spindle, the main shaft, the chuck and the retainer device are all aligned with and symmetrical with respect to the drill axis J, defined to be along the central axis of the drill bit 10. The collar has a first bore 22 also symmetrical with respect to the drill axis for fitting the collar over the nose of the chuck.

The chuck key is aligned with respect to a key axis K which is generally normal to the drill axis J, as illustrated in FIG. 2. The chuck key includes a key shaft 42, a key gear 44 affixed to one end of the key shaft and an arm 46 near the other end of the key shaft. The arm has a handle 48 attached at one end for rotating the key shaft about the key axis.

The components of the chuck assembly B are assembled together by placing a key retainer pin 45 of the chuck key 40 into one of the pilot holes 55 of the nose 54 of the chuck C. The key gear 44 has key teeth 44b which mesh with the beveled gear teeth 52a of the beveled gear 52. The chuck is operated to open and close the locking jaws 56 by maintaining the meshing arrangement between key and beveled gear teeth respectively when the chuck key 40 is rotated about the key axis K. The meshing arrangement is maintained by placing the collar in position over the nose of the chuck and affixing the collar in place on the nose using a fastener 21. Key cutouts 25 in the collar receive the meshed chuck key and hold the chuck key engaged with the beveled gear of the locking cylinder 50. The jaws are opened to receive the drill bit and closed to grip the drill bit and hold the bit attached to the chuck. The chuck key remains held in place by the collar for further use after normal drilling operations of the drilling machine have been completed.

Figure 5:
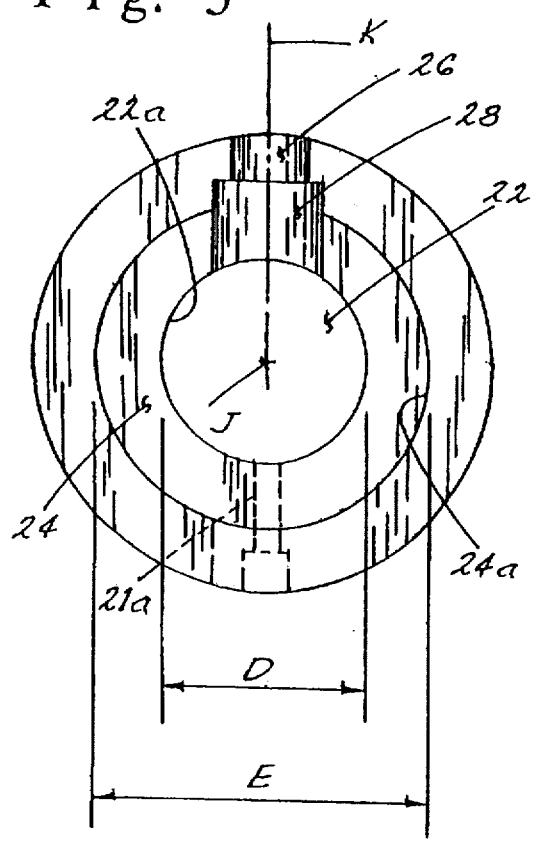
FIG. 5 is a cross sectional view of the collar of this invention taken along line 5—5 in FIG. 4.
Figure 4:
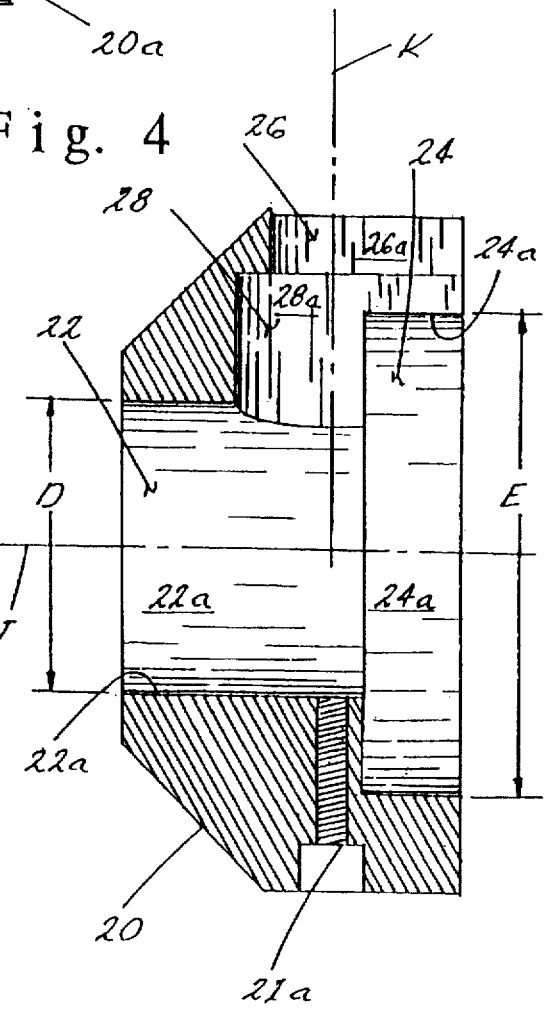
FIG. 4 is an end elevation view of the collar of this invention taken parallel to a drill axis of the drilling machine.

Further details of the collar's geometry are disclosed in the illustrations of FIGS. 3, 4 and 5. A cross-sectional view taken along line 5—5 in FIG. 3 is illustrated in FIG. 4. The collar 20 includes a first cylindrical bore 22 and a second cylindrical bore 24 formed symmetrically along the drill axis and located end to end with respect to one other. The first or nose bore 22 has a cylindrical surface 22a with a first bore diameter D. The second or beveled gear bore 24 has a cylindrical surface 24a with a second bore diameter E. The key cutouts 25 extend from the cylindrical bores 22 and 24 radially outward from the drill axis J to an exterior to the collar and include a key shaft cutout 26 and a key gear cutout 28. The key shaft cutout provides and the key shaft cutout surface 26a and the key gear cutout provides the key gear cutout surface 28a. The fastener bore 21a may be a threaded bore to receive a threaded set screw.

An end view of the collar taken along the drill axis of the chuck assembly is illustrated in FIG. 5. Once again, the first and second bores 22 and 24 are shown; along with the key shaft cutout 26 and the key gear cutout 28 extending radially outward along the key axis K from the first and second bores. First and second diameters D and E show the radial extent of the first and second bore surfaces 22a and 24a respectively from the drill axis J. The fastener bore 21a is again shown on the opposite side of the collar from the key cutouts 25. A set screw can be used as a fastener, which requires the fastener bore to have matching threads. Other fastener types can also be used to affix the collar to the nose of the chuck.

Figure 6:
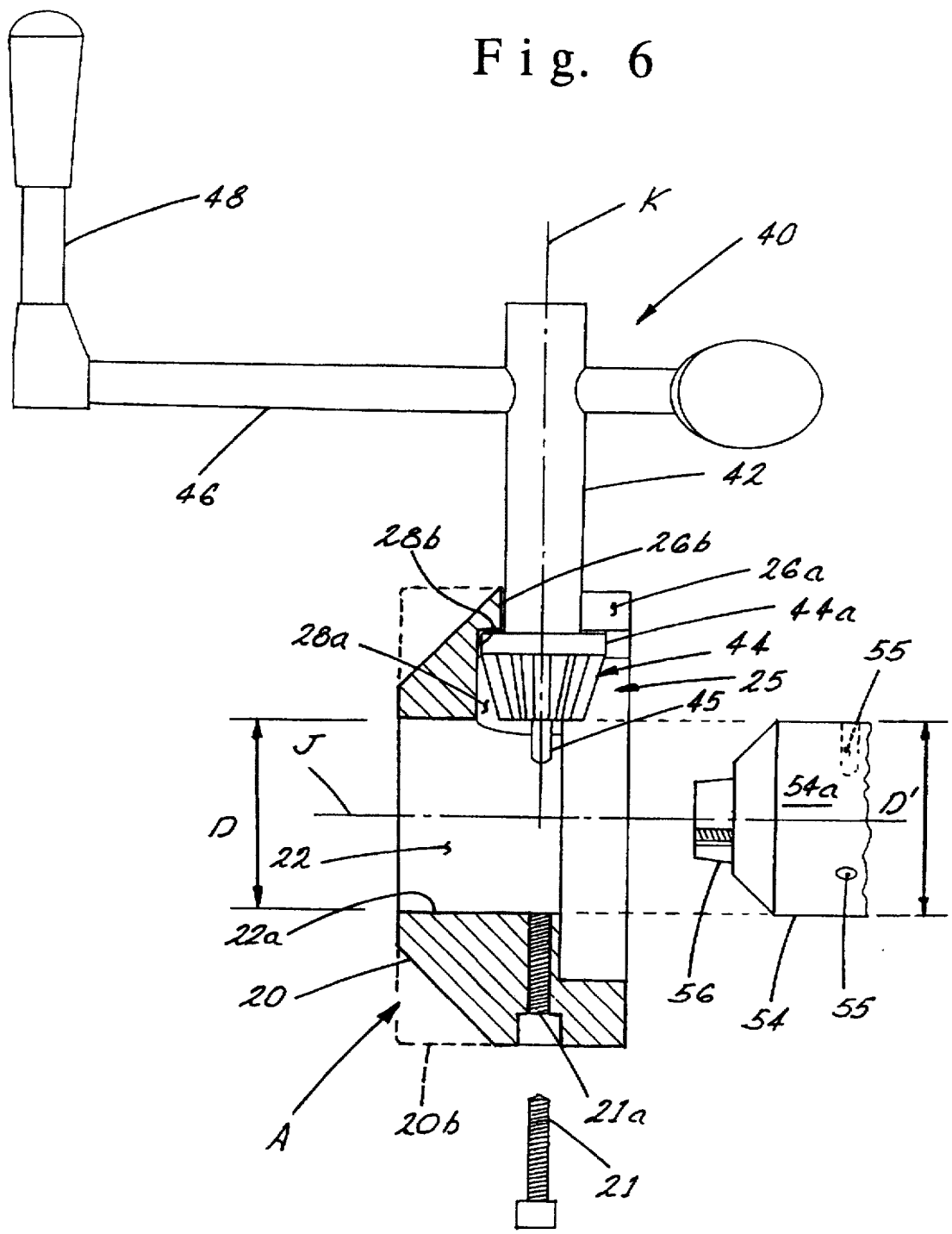
FIG. 6 is a elevation view of the chuck key and a cross-sectional view of the collar of this invention illustrated their operational position relative to each other and their axial position in relation to the nose of the chuck.

An enlarged view of the chuck key, the nose of the chuck and the collar in section is illustrated in FIG. 6. This illustration shows how the key gear 44 and key shaft 42 of the chuck key 40 interface with the cutouts 25 in the collar 20 of the retainer device A. In the preferred embodiment of this invention, the key gear has a key gear collar 44a that is contacted by the key gear contact area 28b of the key gear cutout surface 28a to hold the key gear in an operational position against the chuck so that the chuck key can remain aligned with the key axis K when rotated. The arm 46 and handle 48 of the chuck key can also be adjusted in a perpendicular direction to the key shaft, as shown by the arrow. The key retainer pin 45 is inserted in pilot holes 55 of the nose 54 of the chuck to help retain the key gear in the operational position when operating the locking jaws 56. In addition, the key shaft 42 is contacted by the key shaft contact area 26b of the key shaft cutout surface 26a to help hold the key gear in the operational position against the chuck. The fastener 21 holds the collar 20 affixed to the nose 54.

The collar of FIG. 6 has an internal first diameter D larger than an outer diameter D' of the nose 54. A close fit is desirable between the outer surface 22a of the first bore and the outer surface 54a of the nose for positive attachment of the collar to the nose when the fastener 21 contacts the nose. The first diameter D is formed to have a value in a range of 0.000 inch to 0.002 inch greater than the outer diameter D' of the nose. The collar can be made to have a cylindrical shape which is economical to build by eliminating the beveled edge as shown by the dashed line 20b. The preferred shape of the collar includes the beveled edge.

Figure 7:
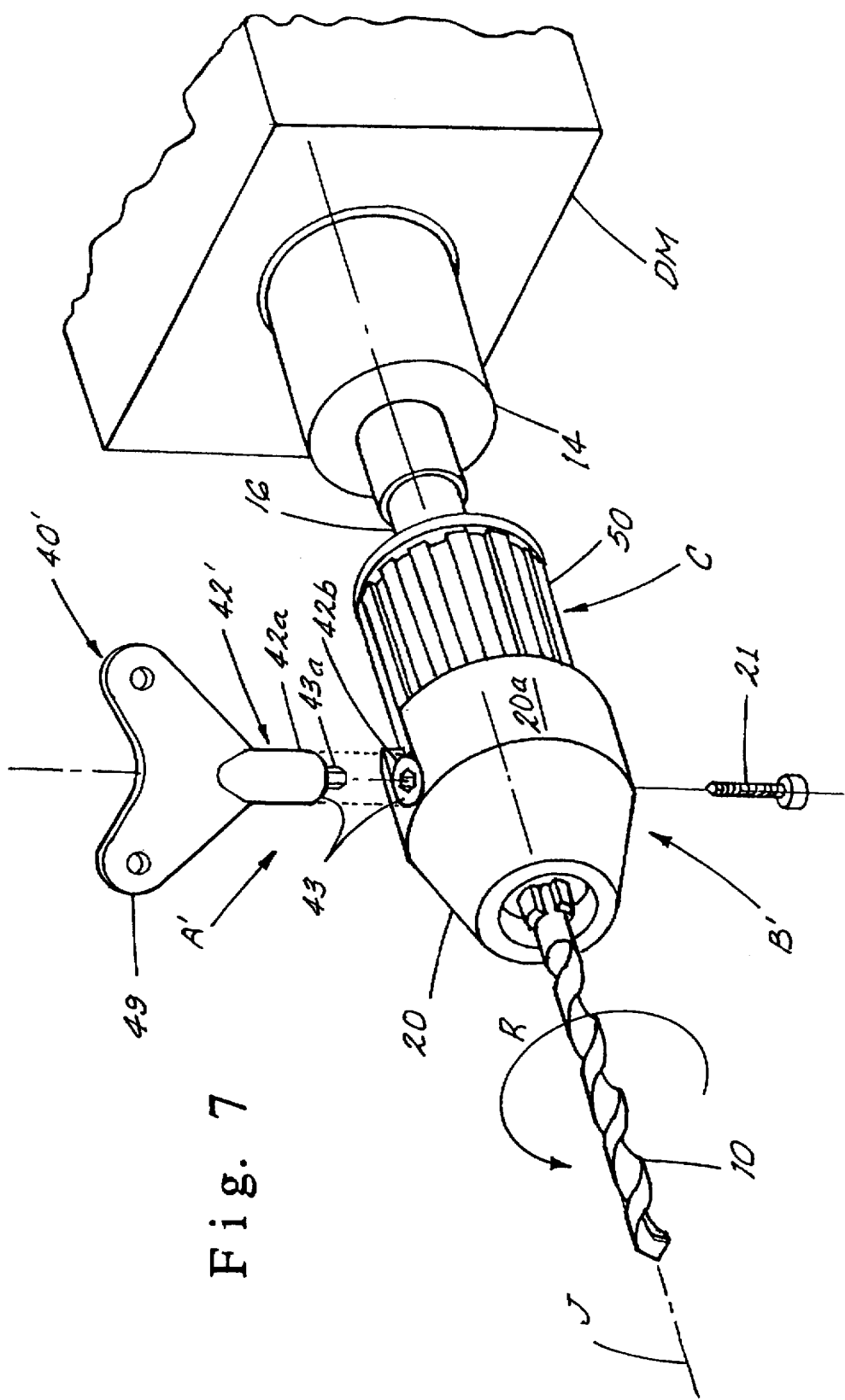
FIG. 7 is a perspective view of a rotating chuck assembly for a drilling machine showing a two part chuck key having removable handle and key shaft portions.

In an alternate embodiment of the present invention a retainer device A' of the chuck assembly B' is made for a rotating chuck assembly, as illustrated in FIG. 7. This embodiment is typical of certain drilling machines DM including drill presses, hand drills and other rotating shaft drilling tools. A rotation, shown by the curved arrow R, of the chuck assembly, drill bit 10, main shaft 16 and spindle 14 exists about the drill axis J. The retainer device A has been modified so that the a two part chuck key is used to provide a removable key shaft portion and key handle to be stored while the remainder of the chuck assembly B' rotates. Once again, the collar 20 is affixed to the chuck C using the fastener 21.

A chuck key 40' is illustrated in FIG. 7 having a two part key shaft 42' including a removable key shaft portion 42a and a fixed key shaft portion 42b that remains with the collar 20 when rotating the chuck assembly B. A key shaft interface 43 exists at a location where the removable key shaft 42a and the fixed key shaft 42b are connected. The key shaft interface can be made to co-extend along the outer face 20a of the collar 20. An interface tool 43a is formed at the shaft interface to transfer torque about the key axis from the removable key shaft 42a to the fixed key shaft 42b. A removable handle 49 attached to the removable shaft handle is provided for assisting in applying the torque to the two part key shaft 42'. Pulling on the handle in a direction along the key axis K will separate the removable key shaft from the fixed key shaft at the key interface. Different interface tools can be designed within the scope of this invention to be consistent with the function of the key interface 43 of the two part key shaft 42'.

Figure 8:
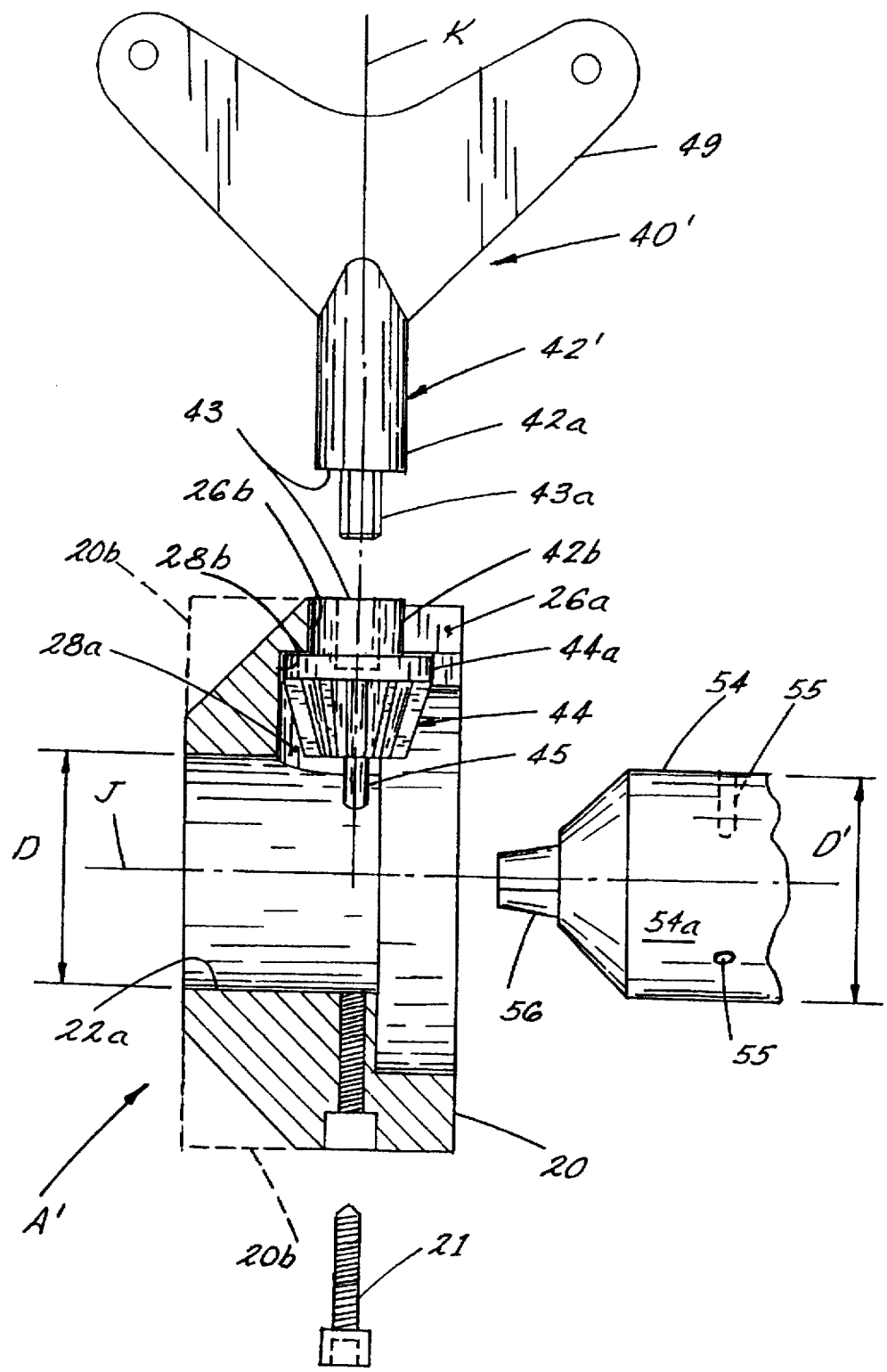
FIG. 8 is a elevation view of the two part chuck key and a cross-sectional view of the collar of this invention illustrated their operational position relative to each other and their axial position in relation to the nose of the chuck.

An enlarged view of the two part chuck key 40', the nose of the chuck 54 and the collar 20 in section is illustrated in FIG. 8. This illustration shows how the key gear 44 and fixed key shaft 42b of the chuck key 40' interface with the cutouts 25 in the collar 20 of a retainer device A'. Once again, in the preferred embodiment of this invention, the key gear has a key gear collar 44a that is contacted by the key gear contact area 28b of the key gear cutout surface 28a to hold the key gear in an operational position so that the chuck key can remain aligned with the key axis K when rotated. The removable key shaft portion 42a of the two part key shaft 42' and the removable handle 49 can also be connected with the fixed key shaft portion 42b at the key shaft interface 43 and aligned along the key axis K direction, as shown by the arrow. The key interface tool 43a rotationally connects the removable key shaft portion 42a with the fixed key shaft portion 42b at the key shaft interface. The key retainer pin 45 is inserted in pilot holes 55 of the nose 54 of the chuck to help retain the key gear in the operational position when operating the locking jaws 56. In addition, the fixed key shaft 42b is contacted by the key shaft contact area 26b of the key shaft cutout surface 26a to help hold the key gear in the operational position against the chuck. The fastener 21 holds the collar 20 affixed to the nose 54 and the key gear 44 remains within the key gear cutout.

The collar of FIG. 8 is essentially the same as the collar of FIG. 6. As previously disclosed, the collar 20 has an internal first diameter D larger than an outer diameter D' of the nose 54. A close fit is again desirable between the outer surface 22a of the first bore and the outer surface 54a of the nose for positive attachment of the collar to the nose when the fastener 21 contacts the nose. The first diameter D is again formed to have a value in a range of 0.000 inch to 0.002 inch greater than the outer diameter D' of the nose 54 for this embodiment of the key retainer device A. This close tolerance is quite critical for this embodiment for reducing the effect of any rotational imbalance due to the rotating key retainer device A'. Once again, the beveled edge can be eliminated by making the collar conform to the dashed line 20b to provide an cylindrical shaped collar being more economical to build. The beveled edge is preferred to have a rotating collar with less mass.

While a preferred embodiment of the invention has been described using specific terms, such description is for illustrative purposes only, and it is to be understood that changes and variations may be made without departing from the spirit or scope of the following claims.

What is claimed is:

1. A chuck assembly for gripping and releasing a bit held by a drilling machine comprising:
    a chuck having a nose, a locking cylinder with a beveled gear and locking jaws within said nose for gripping and releasing said bit positioned along a drill axis when said nose is rotated relative to said locking cylinder;
    a chuck key slidably mounted in said nose along a key axis normal to said drill axis, said chuck key having a key gear for engaging said beveled gear of said locking cylinder and said chuck key being rotatable about said key axis;
    a collar having a first bore for fitting said collar over said nose and a second bore larger than the first bore for encompassing said beveled gear of said locking cylinder;
    a fastener for holding said collar attached to said nose of said chuck; and
    said collar having key cutouts for containing and holding said key gear of said chuck key in an engaged relationship with said beveled gear of said locking cylinder, so that turning said chuck key about said key axis provides said rotation of said nose with respect to said locking cylinder to operate said locking jaws.

2. The chuck assembly of claim 1 wherein the chuck key for said chuck which is operated to be translating along said drill axis includes:
    a key shaft with said key gear supported at one end and an arm extending through said shaft near the other end; and
    a handle extending from said arm to assist in rotating said key shaft about said key axis during said engaged relationship.

3. The chuck assembly of claim 1 wherein said chuck key is used with said chuck which is operational to rotate about said drill axis and includes:
    a two part key shaft having a fixed key shaft portion and a removable key shaft portion;
    said fixed key shaft portion being affixed to said key gear and remains contained by said collar; and
    said removable key shaft portion being disengaged from said fixed key shaft portion during said rotation of said chuck.

4. The chuck assembly of claim 3 wherein said chuck key includes:
    a handle affixed to said removable key shaft portion for operating said chuck key;
    a key shaft interface between said fixed and removable key shaft portions for engaging said removable key shaft portion and handle with said fixed key shaft portion; and
    said key shaft interface including an interface tool for interlocking said two part key shaft together for transferring torque applied to said handle about said key axis to said key gear to operate said locking jaws.

5. The chuck assembly of claim 1 wherein said collar is made of a metallic material machined so that said first bore has a first diameter for fitting said collar over said nose of said chuck to provide a close tolerance fit.

6. The chuck assembly of claim 5 wherein said first diameter has a value generally larger than an outer diameter of said nose in a range of about 0.000 inch to about 0.002 inch.

7. The chuck assembly of claim 5 wherein said second bore of said collar has a second diameter for fitting said collar over said locking cylinder to include said beveled gear.

8. The chuck assembly of claim 7 wherein said second diameter has a value larger than an outer diameter of said locking cylinder so that said locking cylinder with said beveled gear is free to rotate with respect to said collar about said drill axis.

9. The chuck assembly of claim 1 wherein said fastener is a set screw type fastener for screwing into a threaded bore of said collar to contact said nose of said chuck and hold said collar attached to said nose so that said collar is generally aligned with said drill axis.

10. A key retainer device for holding a chuck key in an engaged relationship with a chuck of a drilling tool, said device comprising:
    a collar machined to partially encompass said chuck;
    a first axial bore of said collar having a first diameter for fitting said collar over a nose portion of said chuck;
    a second axial bore of said collar having a second diameter for fitting said collar over a beveled gear portion of said chuck;
    at least one key cutout of said collar to accommodate a key gear and shaft of said chuck key so that said collar makes contact with and holds said chuck key in said engaged relationship so that said chuck key is free to rotate; and
    a fastener for attaching said collar to said nose portion of said chuck so that rotating said chuck key operates said chuck, wherein a drill bit can be gripped or released by said chuck.

11. The key retainer device of claim 10 wherein said at least one key cutout includes:
    a key shaft cutout having an key shaft cutout surface for partially contacting a shaft of said chuck key; and
    a key gear cutout having a key gear cutout surface for partially contacting a key gear of said chuck key, wherein said key shaft and gear cutouts provide said key cutouts so that said collar can be directly installed onto said chuck of said drilling tool to include said chuck key.

12. The key retainer device of claim 11 wherein said key shaft cutout surface includes a key shaft contact area making direct contact with said shaft of said chuck key and said key gear cutout surface includes a key gear contact area making direct contact with said key gear of said chuck key so that said engaged relationship is provided.

13. The chuck assembly of claim 10 wherein said first diameter has a value generally larger than an outer diameter of said nose portion of said chuck in a range of about 0.000 inch to about 0.002 inch.

14. The chuck assembly of claim 10 wherein said second diameter has a value large enough for fitting said collar over said beveled gear portion of said chuck.

15. In a drill machine, a drill chuck, a chuck key slidably mounted in the drill machine adjacent said chuck, a collar slidably mounted on the drill machine and engaging with the chuck for biasing said chuck key toward a locking engagement with said chuck and holding said chuck key engaged with said chuck, and a fastener for holding said collar engaged with said chuck so that said chuck key is held in position against said chuck but is free to rotate in operating said chuck for gripping and releasing a bit of said drill machine.

16. In the drill machine of claim 15, said collar having first and second axial bores for slidably mounting said collar on said drill chuck of said drill machine along a drill axis of said drill machine.

17. In the drill machine of claim 16, said first axial bore having a first diameter which is slightly larger than a nose of the drill chuck for fitting said collar over said nose to that said holding and biasing of said chuck key with said drill chuck is realized.

18. In the drill machine of claim 15, said collar having at least one cutout to receive and partially contain said chuck key within said collar when said chuck key is biased toward said locking engagement.

19. In the drill machine of claim 15, said chuck key including a removable shaft portion, a removable handle, a fixed shaft portion and a gear, wherein said removable shaft portion and said removable handle are disengaged from said fixed shaft portion when said drill chuck is rotationally driven.

* * * * *